United States Patent
Pitamitz et al.

(10) Patent No.: US 7,717,994 B2
(45) Date of Patent: May 18, 2010

(54) COATING MATERIALS FOR CORES

(75) Inventors: Herbert Pitamitz, Wuppertal (DE); Gernot Lederer, Mettmann (DE)

(73) Assignee: Ashland-Sudchemie-Kernfest GmbH, Wulfrath (DE)

( * ) Notice: Subject to any disclaimer, the term of this patent is extended or adjusted under 35 U.S.C. 154(b) by 967 days.

(21) Appl. No.: 10/545,710

(22) PCT Filed: Feb. 10, 2004

(86) PCT No.: PCT/EP2004/001219

§ 371 (c)(1),
(2), (4) Date: Jul. 24, 2006

(87) PCT Pub. No.: WO2004/071738

PCT Pub. Date: Aug. 26, 2004

(65) Prior Publication Data

US 2007/0000410 A1    Jan. 4, 2007

(51) Int. Cl.
*B28B 7/36* (2006.01)

(52) U.S. Cl. .............. 106/38.22; 106/38.23; 106/38.24; 106/38.25; 106/38.27; 523/139; 523/145

(58) Field of Classification Search ............... 106/38.22, 106/38.23, 38.24, 38.25, 38.26, 38.27; 523/139, 523/145

See application file for complete search history.

(56) References Cited

U.S. PATENT DOCUMENTS

| | | | |
|---|---|---|---|
| 3,501,320 A | 3/1970 | Pietryka et al. | |
| 3,692,551 A | 9/1972 | Weaver | |
| 3,764,575 A * | 10/1973 | Anderko et al. | 523/143 |
| 4,667,727 A | 5/1987 | Barlow et al. | |
| 4,713,294 A * | 12/1987 | Armbruster et al. | 428/404 |

FOREIGN PATENT DOCUMENTS

| | | |
|---|---|---|
| EP | 0718085 | 12/1995 |
| GB | 170677 | 10/1921 |
| GB | 1036068 | 5/1963 |
| JP | 06047489 | 2/1994 |
| WO | WO 93/25365 | 6/1992 |

* cited by examiner

*Primary Examiner*—David M Brunsman
(74) *Attorney, Agent, or Firm*—Kagan Binder, PLLC

(57) ABSTRACT

The invention relates to coating material comprising a water-soluble salt as a filler. Such materials are especially suitable as core washes for salt cores for using in foundry technology.

10 Claims, No Drawings

COATING MATERIALS FOR CORES

This application is a 371 of PCT/EP04/01219, filed Feb. 10, 2004.

For quite some time now, cores made of water-soluble salts have increasingly been used in the manufacture of cast or injection-molded metal or plastic parts. Compared to conventional cores, these cores have the advantage that they can easily be removed after the casting process; this is particularly advantageous in the case of channel cores which can be washed out of the mold with water without subjecting the cast product to an additional thermal load.

However, the granularity of the salt particles necessary for the production of such salt cores leads to a surface appearance that is not always uniform. In particular, depending on the salt morphology, a high degree of roughness on the surface of the core may occur which would be transferred to the work piece to be manufactured and therefore renders a direct use of the salt core disadvantageous. According to common practice, salt cores are therefore treated with a coating material in order to ensure a smooth surface of the casting. Usually, such coating materials (core washes) comprise water-insoluble particulate materials which serve as fillers to compensate for any surface irregularities. However, they have a tendency of adhering to the surface of the casting after the core has been removed and represent a potential risk during the use of the casting.

In view of this background it was the object of the present invention to provide an improved coating material for cores. In particular, a coating material was to be provided whose use would still fully offer the inherent advantages of a salt core, such as the possibility of an easy and complete core removal, and which can essentially be removed from the mold or the casting without residue.

This object was achieved by novel coating materials comprising at least one water-soluble salt as a particulate filler which can be washed out during core removal and thus does not leave any residues after the casting which significantly affect the morphology of the casting surface. Such coating materials are advantageously used for salt cores where after the casting they can be removed together with the core in one step by washing. However, they are also suitable for leveling surface irregularities on cores that are not water-soluble themselves, such as for example sand cores. In this case as well, the materials of the present invention facilitate residue-free core removal.

Water-soluble salts of metals of both the main groups and the subgroups of the periodic table are suitable as fillers in the coating materials of the present invention, whereby the term "salts" also encompasses complex salts. Preferably, metals of the first, second and third main group are used as cations, but salts of the subgroup metals can be used as well as long as they are not disadvantageous due to their cost or toxicity. Salts whose cations are formed by sodium, potassium, calcium, magnesium, iron or aluminum are especially preferred. Water-soluble compounds of silicon, tin or lead can also be used.

The anions of the fillers according to the present invention can both be organic or inorganic. Sulfates, hydrogen sulfates, halides such as chlorides and bromides, nitrates, phosphates, hydrogen phosphates, carbonates or hydrogen carbonates, as well as salts of carboxylic acids such as acetates, formats or citrates, have proven suitable in practical applications.

It is especially preferred to use alkali and alkaline-earth metal salts such as for example sodium chloride, sodium sulfate, potassium chloride or potassium sulfate as water-soluble salts. Suitable salts can be used both alone and in combination with each other. When a non-aqueous carrier liquid is used, the water-soluble salt is usually present in the ready-to-use coating material in an amount of 10 to 90 wt.-%, preferably 20 to 50 wt.-%, and especially preferred 30 to 40 wt.-%. When the salt is used in a supersaturated aqueous solution, it is naturally present in a slightly higher amount in the coating material, i.e. as a rule such that the solubility product of the salt is exceeded.

In view of a sufficient surface smoothness of the core, the water-soluble salt particles generally—depending on the field of application of the casting—have an average grain size of more than 0.1 µm, preferably more than 1 µm, and especially preferred more than 5 or 10 µm. The upper limit for the grain size is usually 500 µm, preferably 250 µm, and especially preferred 100 µm. A pulverization step, for example grinding the salt, may be necessary to obtain the required grain sizes.

In order to ensure a speedy removal of the coating material residues during the removal of the core, the salt used as a filler should preferably have a solubility of at least 10 g/l in water. Salts whose water solubility exceeds a value of 50 g/l, 100 g/l or even 200 g/l are especially preferred.

In addition to the water-soluble salt, the coating material according to the present invention comprises further essential and optional components which are already being used in conventional core washes for cores, in particular salt cores. For instance, the ready-to-use material comprises a carrier liquid which, in view of the water-solubility of the filler, can be an organic liquid. Preferably, alcohols such as methanol, ethanol, isopropanol, n-propanol, or butanol, hydrocarbons or hydrocarbon mixtures such as light gasoline, gasolines of a medium boiling point range, optionally with aromatic components, or kerosine, polar aprotic solvents such as ketones or ethers, for example acetone, methyl ethyl ketone, ethylene glycol mono- and dialkyl ethers, are used for this purpose. If desired, the coating materials of the present invention can also be provided on a purely aqueous basis with the salt portion being above the solubility limit of the salt at the intended application temperature.

For their use in foundry technology, the coating materials of the present invention preferably comprise a binder which serves to ensure hardening of the components of the coating material and to provide an abrasion-resistant coating. Preferably, temporary binders are used for this purpose which only exhibit their binding properties in a limited temperature range and which decompose at the temperature of the liquid metal. Such binders, which for example withstand temperatures of up to about 400° C., therefore do not necessarily have to be water-soluble themselves to be used in the present invention. Typical examples of suitable temporary binders include phenolic resins, such as novolak, resol, polyamides, polyvinyl butyral, polyvinyl alcohol, ethyl cellulose or natural resins such as colophony or wood rosin.

In addition to the water-soluble salts, the coating materials of the present invention can comprise further water-soluble or water-insoluble fillers. However, the grain size of water-insoluble fillers is preferably in a range that essentially does not affect the surface of the casting, i.e. generally in the lower µm or even nm range. Finally, the coating materials of the present invention can comprise further conventional additives such as for example suspending agents, wetting agents and dispersing agents, standardizing agents and/or rheologic additives.

For commercial distribution, the coating material of the present invention can be provided as a finished formulated coating material including the carrier liquid. It can also be distributed in the form of a paste. In that case, a suitable amount of carrier liquid necessary to adjust the required viscosity and density properties of the material has to be added in order to obtain a ready-to-use coating material. Furthermore, the coating material can be sold as a solids mixture in powder form, to which the necessary amount of carrier liquid has to be added to produce a ready-to-use core wash.

The carrier liquid of the coating material of the present invention in a ready-to-use state usually has a solids content between 10 and 60 wt.-%, preferably between 20 and 50 wt.-%, and especially preferred between 30 and 45 wt.-%.

An exemplary process for coating a salt core with a coating material according to the present invention comprises the steps of
a) providing the coating material;
b) applying the coating material to the salt core; and
c) drying the coated salt core.

The coating material provided by the present invention can be applied according to various known processes. Examples include dip coating, flow coating, spray coating and spread coating. The application by means of dip coating is especially preferred.

The time required for the excess coating material to flow off depends on the flowing-off properties of the used coating material. After a sufficient flow-off time, the coated porous piece is subjected to drying. All known processes, such as for example drying by means of microwaves or convection ovens, can be used as drying processes. In a preferred embodiment of the invention, the coated piece is dried at 100 to 250° C., especially preferred 120 to 180° C., in a convection oven.

The invention will be described in more detail in the following examples. Unless stated otherwise, the amounts given refer to parts by weight.

EXAMPLES

Example 1

A coating material of the following composition was applied to a salt core using a dip coating process.

| | |
|---|---|
| Isopropanol | 58.5 |
| White spirit | 2.0 |
| Tixogel MPZ ® | 2.2 |
| Acetone | 1.2 |
| Colophony resin solution, about 40% | 1.3 |
| Sodium chloride, average particle size 30 μm | 34.5 |

The core wash showed good dipping properties on the salt core without the formation of drops or curtaining. It resulted in a uniform coating both after air-drying and drying in a circulating air oven.

Example 2

A coating material produced analogously to Example 1 but with potassium sulfate instead of sodium chloride also resulted in a uniform coating on the salt core used as a test piece.

The invention claimed is:

1. Coating material for cores comprising at least one water-soluble salt in the form of a particulate filler, a carrier liquid and a binder.

2. Coating material according to claim 1, wherein the average grain size of the water-soluble salt is between 0.1 μm and 500 μm.

3. Coating material according to claim 1, wherein the water-soluble salt comprises at least one cation selected from the cations of the metals sodium, potassium, calcium, magnesium, iron or aluminum.

4. Coating material according to claim 1, wherein the water-soluble salt comprises an anion selected from a sulfate, halide, nitrate, phosphate, carbonate, acetate, formate or citrate anion, 5. Process for coating a core, comprising applying a coating material according to claim 1 to the core.

6. Process according to claim 5, wherein the core is a salt core.

7. Process according to claim 5, wherein the core is a sand core.

8. The process according to claim 5 comprising the steps of:
a) providing a core for use in manufacture of cast or injection-molded metal or plastic parts;
b) applying a coating material comprising at least one water-soluble salt in the form of a particulate filler, a carrier liquid and a binder to the core by a process selected from the group consisting of dip coating, flow coating, spray coating and spread coating.

9. A method of manufacture of cast or injection-molded metal or plastic parts, wherein the method comprises treatment of a core with a coating material of claim 1.

10. The method of manufacture according to claim 9, comprising the steps of:
a) providing a core made of water-soluble salt for use in manufacture of cast or injection-molded metal or plastic parts;
b) applying a coating material comprising at least one water-soluble salt in the form of a particulate filler, a carrier liquid and a binder to the core to form a coated core by a process selected from the group consisting of dip coating, flow coating, spray coating and spread coating;
c) casting or injection molding the metal or plastic part in the coated core; and
d) washing the coated core away with water.

* * * * *